3,121,711
PHENYLPHENAZINIUM CATIONIC DYES
David Gordon Coe, Mendenhall, Pa., assignor to E. I. du Pont de Nemours and Company, Wilmington, Del., a corporation of Delaware
No Drawing. Filed May 27, 1960, Ser. No. 32,149
4 Claims. (Cl. 260—146)

This invention relates to novel organic compounds which are useful as dyes for acid-modified polyester fiber. By the latter term, I mean polyethylene terephthalate fiber containing metal-sulfonate groups, as described more fully in British Patent No. 826,248, accepted December 31, 1959.

I have found that safranine-azo dyes which possess in the coupling component a 2-cyanoalkylamino group possess affinity for acid-modified polyester fiber and produce thereon exceptionally strong dyeings in blue shades, that is, in the range from greenish-blue to violet. Moreover, the dyeings thus obtained possess outstanding fastness to light and to washing. They also possess superior shade stability to acid within certain ranges of the pH scale. Other advantages and good qualities will appear as the discussion proceeds.

Accordingly, my invention embraces new compounds which may be expressed by the general formula

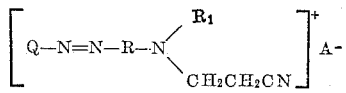

wherein Q—N=N— is the diazo radical of adiamino-N-phenylphenazine which is free of ionizable acid substituents, R is a mononuclear homocyclic aryl radical free of ionizable acid substituents, $R_1$ is a member of the group consisting of hydrogen, lower alkyl, 2-hydroxyethyl and 2-cyanoethyl, and $A^-$ is a water-solubilizing ion.

In a more particular sense, the novel compounds of this invention are expressible by the formula

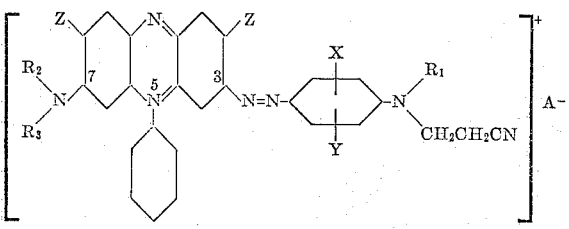

wherein Z is hydrogen or methyl; $R_2$ and $R_3$ represent hydrogen or lower alkyl; $R_1$ is hydrogen, lower alkyl, 2-hydroxyethyl or 2-cyanoethyl; X is hydrogen, methyl or methoxy; Y is hydrogen, halogen, methyl or methoxy; and $A^-$ is a water-solubilizing anion such as halide, sulfate, phosphate or $ZnCl_3^-$. By "lower alkyl" throughout this specification and claims I mean an alkyl radical of 1 to 4 C-atoms.

These novel compounds may be obtained by diazotizing a safranine compound of the formula Q—$NH_2$, wherein Q is the 3-radical of a safranine compound as above defined, and coupling in acid medium to an aniline compound of the formula

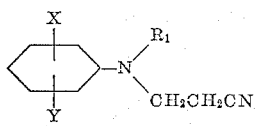

wherein X, Y and $R_1$ have the same meaning as above.

I find that the novel compounds of the above general formulas not only have superior light-fastness and wash-fastness when applied to acid-modified polyester fiber, but their synthesis proceeds much more smoothly than with aniline type coupling components whose N-atom bears only alkyl or hydroxyalkyl radicals. As a result of this, the dyes of this invention are obtained in a high state of purity and are capable of being used directly in the dyeing of the mentioned fiber, without any further purification. They also possess an outstandingly high tinctorial power on the particular fiber above mentioned and produce thereon dyeings of greater depth than obtainable by hitherto customary cationic dyes.

Without limiting this invention, the following examples are given to illustrate my preferred mode of operation. Parts mentioned are by weight.

EXAMPLE 1

21 parts of 3,7-diamino-2,8-dimethyl-5-phenylphenazinium chloride (C.I. No. 50240) are suspended in 1100 parts of water and heated to 90° C. for 30 minutes. The solution is cooled by the addition of 900 parts of ice and diazotized at 10° to 15° C. by adding 32 parts of 2 N sodium nitrite solution and 37 parts of 20% hydrochloric acid. After diazotization is complete the excess nitrous acid is destroyed with sulfamic acid. 24 parts of sodium acetate dissolved in 40 parts of water are then added, followed at once by 9.6 parts of N-2-cyanoethyl-N-methylaniline dissolved in a mixture of 48 parts of ethanol and 17 parts of 20% hydrochloric acid. The mixture is agitated for 16 hours and then heated to 60° C. 13.5 parts of 47% zinc chloride are added followed by 50 parts of sodium chloride. The product is then filtered off and washed with 5% brine to yield a dye having the following structure:

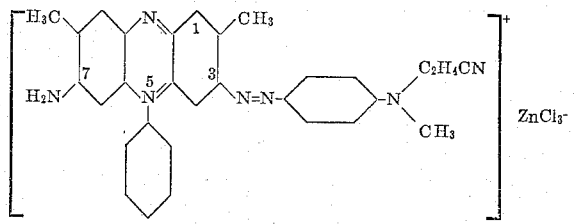

The absorption maximum of a methanol solution of the dye is located at 580 millimicrons. It dyes acid-modified polyester fiber (by the procedure of Example 5 below) in deep blue shades of outstanding fastness to light and washing. It also dyes acrylic fiber from a hot, weakly-acidic, aqueous dyebath in light-fast, wash-fast, but rather weaker blue shades.

For analytical purposes, the above color may be purified by re-crystallization from methanol, but for commercial purposes it is sufficiently pure as prepared.

If the 9.6 parts of N-2-cyanoethyl-N-methylaniline in this example are replaced by the cyanoalkylamines and quantities indicated below, dyes of similarly high fastness qualities but of shades as indicated are obtained.

| Coupling component | Parts | Absorption max. in methanol, millimicrons | Shade on acid-modified polyester fiber |
|---|---|---|---|
| N-2-cyanoethyl-o-chloraniline | 10.8 | 560 | violet. |
| N-2-cyanoethyl-N-2-hydroxyethylaniline. | 11.4 | 590 | blue. |
| N-2-cyanoethylaniline | 8.7 | 560 | reddish-navy. |
| N-2-cyanoethyl-m-toluidine | 9.6 | 595 | navy. |

EXAMPLE 2

By using 22.6 parts of 3-amino-7-diethylamino-5-phenylphenazinium chloride (C.I. No. 50206) in place of the diazo component named in Example 1 and diazotizing and coupling to N-2-cyanoethyl-N-ethyl-m-toluidine in the same manner as described in Example 1, a green-blue dye is obtained having the following composition:

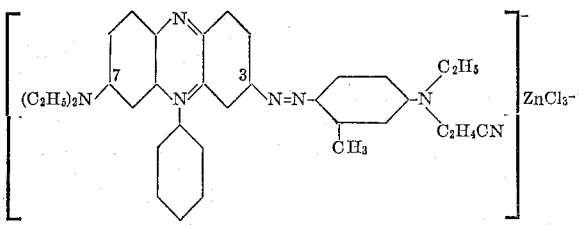

The absorption maximum of a methanol solution of the color is located at 645 millimicrons. It dyes acid-modified polyester fiber in strong greenish-blue shades. In a like manner 22.6 parts of 3-amino-7-diethylamino-5-phenylphenazinium chloride may be diazotized and coupled to the following materials:

| Coupling component | Parts | Absorption max. in methanol, millimicrons | Shade on acid-modified polyster fiber |
| --- | --- | --- | --- |
| N-2-Cyanoethylaniline | 8.7 | 600 | blue. |
| N-2-Cyanoethyl-N-methylaniline | 9.6 | 620 | green-blue. |
| N-2-Cyanoethyl-o-chloraniline | 10.8 | 590 | red-blue. |
| N-2-Cyanoethyl-N-ethylaniline | 10.4 | 630 | green-blue. |

Variations in the volume and coupling conditions will be readily apparent to those skilled in the art. The following will serve as an example:

EXAMPLE 3

21 parts of 3,7-diamino-2,8-dimethyl-5-phenylphenazinium chloride are suspended in 450 parts of water, and 240 parts of ice are added, followed by 25 parts of 30% hydrochloric acid. The temperature is maintained at 0° C., and 13 parts of 30% sodium nitrite solution are added; on completion of diazotization, the excess nitrous acid is destroyed and 11.4 parts of N-2-cyanoethyl-N-ethyl-m-toluidine are added. After agitating for 30 minutes at 0° C., 8.5 parts of zinc chloride are added, followed an hour later by sufficient 25% sodium formate solution to bring the pH to 2.5–3.0. The color is filtered off and washed with 5% brine to give a dye having the following composition:

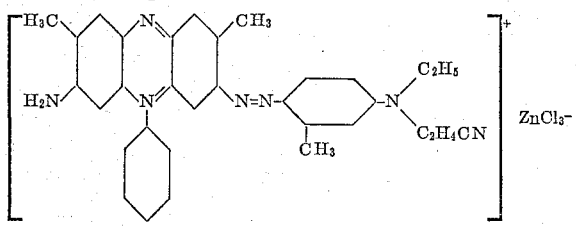

The dye has an absorption maximum in methanol at 580 millimicrons, and it dyes acid-modified polyester fiber in strong green-blue shades having good light-fastness and wet-fastness properties.

EXAMPLE 4

23.4 parts of 3-amino-7-diethylamino-2-methyl-5-phenylphenazinium chloride (C.I. No. 50216) are diazotized and coupled to 11.4 parts of N-2-cyanoethyl-N-ethyl-m-toluidine as in Example 3 to yield a dye having the structure

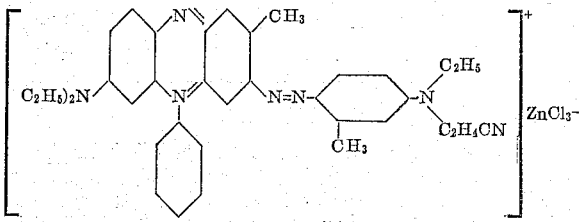

When applied to acid-modified polyester fiber, it gives a slightly greener dyeing than obtained in Example 3.

EXAMPLE 5

*Typical Dyeing Procedure*

A dyebath is prepared by mixing:

| | Parts |
| --- | --- |
| The product of Example 1 | 1.0 |
| Glacial acetic acid | 1.0 |
| Non-ionic surfactant (e.g. the condensation product of one mole of oleyl alcohol with 20 moles of ethylene oxide) | 1.2 |
| Dimethylterephthalate | 0.8 |
| Benzanilide | 0.8 |
| Water to make a total of | 4000 |

100 parts of a fabric consisting of acid-modified polyester fiber are entered into the dyebath (having a pH about 5) and the bath temperature is raised to 212° F. and maintained for 2 hours. At the end of this time the cloth is removed, rinsed in water, and scoured for 15 minutes at 200° F. with 0.3 part of the sodium salt of the sulfate of the condensation product of ethylene oxide and oleyl alcohol (20 moles:1 mole) dissolved in 4000 parts of water. The fabric is then removed from the scour bath, rinsed in water, and dried.

It will be understood that the details of the above examples may be varied widely within the skill of those engaged in this art. Thus, in lieu of monocyanoethyl anilines named as coupling components in the examples, one may also use the corresponding N-bis-2-cyanoethyl compounds or the N-mono- or bis-2-cyanoethyl derivatives of 5-chloro-2-methoxyaniline, 2,5-dimethoxyaniline, o, m or p-xylidine, etc.

In lieu of the safranine named in Example 2, one may use the 7-methylamino or 7-dimethylamino homologs.

Instead of diazotizing in the presence of hydrochloric acid, one may employ other acids, for instance sulfuric or phosphoric. In the isolation step, the addition of zinc chloride is optional. As a consequence of these two factors, the $A^-$ in the above general formula may represent any convenient water-solubilizing anion, such as chloride, bromide, sulfate, phosphate or $ZnCl_3^-$.

The advantages of my invention will now be readily understood. Hitherto, acid-modified polyester fiber has been dyed mostly with disperse dyes and cationic dyes. Both of these classes, however, suffer from inherent disadvantages. Thus, disperse dyes are not fast to washing and sublimation, while cationic dyes (basic dyes) generally have poor light-fastness on this particular fiber. Furthermore, both of these classes are sensitive to residual quantities of the carrier (e.g. ortho-phenylphenol) generally employed in the dyeing of polyester fiber and part of which inevitably remains in the fiber. My novel compounds of this invention, however, have been found remarkably stable in the presence of such residual quantities of the carrier, and this constitutes one more unforeseen but technically very important advantage of my new series of dyes.

I claim as my invention:

1. A compound of the formula

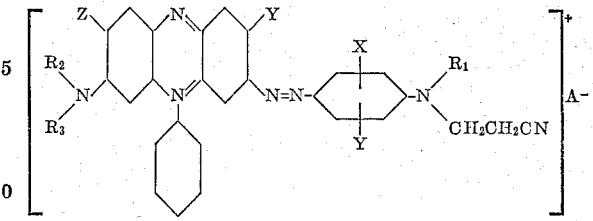

wherein Z is selected from the group consisting of hydrogen and methyl, $R_2$ and $R_3$ represent members of the group consisting of hydrogen and lower alkyl, $R_1$ is selected from the group consisting of hydrogen, lower alkyl, 2-hydroxyethyl and 2-cyanoethyl, X is a member of the group consisting of hydrogen, methyl and methoxy, Y is a member of the group consisting of hydrogen, chlorine, methyl and methoxy, and $A^-$ is a water-solubilizing ion.

2. The compound of the formula

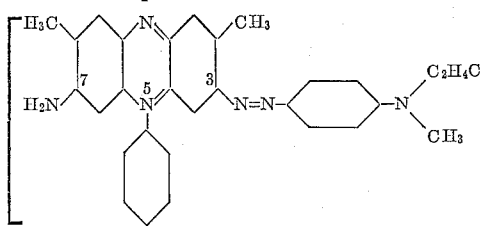

3. The compound of the formula

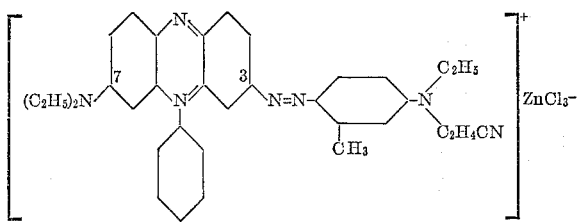

4. The compound of the formula

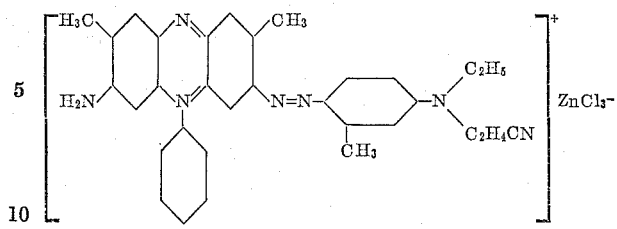

References Cited in the file of this patent

UNITED STATES PATENTS

| | | |
|---|---|---|
| 524,251 | Julius | Aug. 7, 1894 |
| 524,252 | Julius | Aug. 7, 1894 |
| 613,920 | Gutzkow | Nov. 8, 1898 |
| 649,727 | Homolka | May 15, 1900 |
| 659,400 | Scholl | July 16, 1912 |
| 1,726,266 | Hess | Aug. 27, 1929 |
| 2,554,443 | Hayden | May 22, 1951 |
| 2,883,373 | Bossard et al. | Apr. 21, 1959 |
| 2,893,816 | Tsang et al. | July 7, 1959 |

FOREIGN PATENTS

| | | |
|---|---|---|
| 132,390 | Great Britain | Sept. 18, 1919 |